United States Patent
Yangel et al.

(10) Patent No.: US 12,269,512 B2
(45) Date of Patent: Apr. 8, 2025

(54) METHOD FOR TRAINING A MACHINE LEARNING ALGORITHM FOR PREDICTING AN INTENT PARAMETER FOR AN OBJECT ON A TERRAIN

(71) Applicant: YANDEX SELF DRIVING GROUP LLC, Moscow (RU)

(72) Inventors: Boris Konstantinovich Yangel, Nalchik (RU); Maksim Ilich Stebelev, Moscow (RU)

(73) Assignee: Y.E. Hub Armenia LLC, Yerevan (AM)

(*) Notice: Subject to any disclaimer, the term of this patent is extended or adjusted under 35 U.S.C. 154(b) by 668 days.

(21) Appl. No.: 17/580,220

(22) Filed: Jan. 20, 2022

(65) Prior Publication Data

US 2022/0388547 A1    Dec. 8, 2022

(30) Foreign Application Priority Data

Jun. 3, 2021   (RU) ............................ RU2021116056

(51) Int. Cl.
*B60W 60/00*     (2020.01)
*B60R 1/27*      (2022.01)
(Continued)

(52) U.S. Cl.
CPC ......... *B60W 60/00276* (2020.02); *B60R 1/27* (2022.01); *G06V 10/764* (2022.01); *G06V 20/58* (2022.01)

(58) Field of Classification Search
CPC ........ B60W 60/00276; B60W 60/0027; G06V 20/58; G06V 10/82; G06V 10/764; B60R 1/27
See application file for complete search history.

(56) References Cited

U.S. PATENT DOCUMENTS 7,363,309 B1    4/2008  Waite et al.
9,159,023 B2   10/2015  Bone et al.
(Continued)

FOREIGN PATENT DOCUMENTS

CN    106428000 B    12/2018
CN    111626198 A     9/2020
(Continued)

OTHER PUBLICATIONS

Russian Search Report dated Jun. 5, 2023 issued in respect of the counterpart Russian Patent Application No. RU 2021116056.

*Primary Examiner* — Yufeng Zhang
(74) *Attorney, Agent, or Firm* — BCF LLP

(57) ABSTRACT

A method for training a machine learning algorithm for predicting an intent parameter of an object in proximity to a self-driving vehicle on a terrain are provided. The method includes generating a training dataset having assessor-less labels, based on data collected by a training vehicle. The data collected by the training vehicle include data on the state of the training vehicle, the state of a training object, and a training terrain at a target moment in time and at a time after the target moment in time. The training data is based, at least in part, on the data for the target moment in time, and the assessor-less label is based, at least in part, on the data for a time after the target moment in time. A method for operating a self-driving vehicle and a self-driving vehicle are also disclosed.

20 Claims, 6 Drawing Sheets

(51) Int. Cl.
 *G06V 10/764* (2022.01)
 *G06V 20/58* (2022.01)

(56) References Cited

U.S. PATENT DOCUMENTS

| | | | |
|---|---|---|---|
| 9,604,639 | B2 | 3/2017 | Laur et al. |
| 9,776,323 | B2 | 10/2017 | O'Sullivan et al. |
| 9,864,918 | B2 | 1/2018 | Micks et al. |
| 9,983,591 | B2 | 5/2018 | Micks et al. |
| 10,196,058 | B2 | 2/2019 | Paris et al. |
| 10,304,333 | B2 | 5/2019 | Engel et al. |
| 10,338,591 | B2 | 7/2019 | Baalke et al. |
| 10,345,815 | B2 | 7/2019 | Lv et al. |
| 10,486,707 | B2 | 11/2019 | Zelman et al. |
| 10,496,091 | B1 | 12/2019 | Ross et al. |
| 10,627,818 | B2 | 4/2020 | Sapp et al. |
| 10,739,775 | B2 | 8/2020 | Sun et al. |
| 10,782,138 | B2 | 9/2020 | Kaiser et al. |
| 11,970,164 | B1 * | 4/2024 | Havlak ........... B60W 60/00272 |
| 2017/0053169 | A1 | 2/2017 | Cuban et al. |
| 2018/0260635 | A1 | 9/2018 | Al-Dahle et al. |
| 2019/0023239 | A1 | 1/2019 | Fujita et al. |
| 2019/0129436 | A1 | 5/2019 | Sun et al. |
| 2019/0176820 | A1 | 6/2019 | Pindeus et al. |
| 2019/0213887 | A1 | 7/2019 | Kitayama et al. |
| 2019/0367019 | A1 | 12/2019 | Yan et al. |
| 2019/0367020 | A1 | 12/2019 | Yan et al. |
| 2019/0382007 | A1 | 12/2019 | Casas et al. |
| 2020/0023842 | A1 | 1/2020 | Gutierrez et al. |
| 2020/0283016 | A1 | 9/2020 | Blaiotta |
| 2020/0317119 | A1 * | 10/2020 | Huang .................. B60Q 5/006 |

FOREIGN PATENT DOCUMENTS

| | | |
|---|---|---|
| RU | 2629875 C1 | 9/2017 |
| WO | 2017021753 A1 | 2/2017 |
| WO | 2019232355 A1 | 12/2019 |
| WO | 2020025091 A1 | 2/2020 |
| WO | 2020200502 A1 | 10/2020 |

\* cited by examiner

METHOD FOR TRAINING A MACHINE LEARNING ALGORITHM FOR PREDICTING AN INTENT PARAMETER FOR AN OBJECT ON A TERRAIN

CROSS-REFERENCE

The present application claims priority to Russian Patent Application No. 2021116056, entitled "Method for Training a Machine Learning Algorithm for Predicting an Intent Parameter for an Object on a Terrain", filed Jun. 3, 2021, the entirety of which is incorporated herein by reference.

FIELD OF TECHNOLOGY

The present technology relates to computer-implemented methods and for training machine learning algorithms, and more specifically, to methods for generating training a machine learning algorithm to predict an intent parameter for an object on a terrain for use in self-driving vehicles.

BACKGROUND

Self-driving vehicles are vehicles that are able to autonomously drive themselves through private and/or public spaces. Using a system of sensors that detect the location and/or surroundings of the vehicle, logic within or associated with the vehicle controls the speed, propulsion, braking, and steering of the vehicle based on the sensor-detected location and surroundings of the self-driving vehicle.

A variety of sensor systems may be used by the self-driving vehicle, such as but not limited to camera systems, radar systems, and Light Detection and Ranging (LIDAR) systems. Different sensor systems may be employed for capturing different information, and/or in different format, about the location and the surroundings of the self-driving vehicle. For example, camera systems may be used for capturing image data about the surroundings of the self-driving vehicle. In another example, LIDAR systems may be used to capture point cloud data for building 3D map representations of the surroundings and other potential objects located in proximity to the self-driving vehicle.

One problem associated with properly operating a self-driving vehicle is correctly determining the likely intent of other moving objects, such as other vehicles, in the vicinity of the self-driving vehicle. This determination may be influenced by a large number of factors, including detected information on the configuration and motion of surrounding objects, the motion of the self-driving vehicle, and the terrain over which the self-driving vehicle and other objects are moving. If this determination is not correct, it is possible that rapid maneuvers or a even a collision could result.

While a variety of predictive analytic approaches may be used to make this determination, many of these, such as machine learning algorithms, need to be trained using pre-labeled training datasets. To train a machine learning algorithm to accurately predict the "intent" of a moving object from the sensor data available to a self-driving vehicle may require large pre-labeled training datasets, which may be laborious and costly to create.

U.S. Pat. No. 10,739,775 discloses a system and method for real world autonomous vehicle trajectory simulation. Training data from a real-world data collection system is received, ground truth data is obtained, and a plurality of trajectory prediction models are trained. A simulation phase is performed to generate a vicinal scenario for each simulated vehicle. Vicinal scenarios correspond to different locations, traffic patterns, or environmental conditions. Vehicle intention data corresponding to a data representation of various types of simulated vehicle or driver intentions may be provided.

SUMMARY

As discussed above, training a machine learning algorithm to reliably predict the intent of a moving object may require use of a large training dataset. A "naïve" approach for creating the training dataset is to collect data on the state of the self-driving vehicle, the state of the object, and the terrain, and to manually label each such data item with the intent parameter. Manually generating large datasets for training machine learning algorithms is an extremely costly and time-consuming process.

Accordingly, the present technology provides an alternative to using manually-labeled datasets for training machine learning algorithms to determine an intent parameter on a terrain. In particular, the present technology uses an automated approach to generating large training datasets for training machine learning algorithms for use with self-driving vehicles for determining an intent parameter. The technology then uses the machine learning algorithms that have been trained using these datasets to operate a self-driving vehicle. Accordingly, the present technology effectively improves the operation of self-driving or semi-autonomous vehicles.

In accordance with one aspect of the present disclosure, the technology is implemented in a method of training a machine learning algorithm for predicting an intent parameter for an object on a terrain, in which a self-driving vehicle is traveling on the terrain in proximity to the object. The method is executable by a server, and includes accessing, by the server, operational data associated with a training vehicle, the operational data having been previously stored in a storage. The operational data includes data indicative of: a training terrain, states of the training vehicle on the training terrain, and states of a training object on the training terrain.

For a target moment in time in the operational data, the method includes retrieving, by the server from the operational data, data indicative of the training terrain at the target moment in time, a target state of the training vehicle corresponding to the target moment in time, and a future state of the training vehicle after the target moment in time, a target state of the training object corresponding to the target moment in time, and a future state of the training object after the target moment in time. The method also includes generating, by the server, a training set for training the machine learning algorithm, the training set having an input and an assessor-less label. The input includes the data indicative of the training terrain and of the target states of the training vehicle and the training object. The assessor-less label is based on the data indicative of the future states of the training vehicle and the training object. The assessor-less label is indicative of an intent of the training object on the training terrain at the target moment in time.

The method further includes training, by the server, the machine learning algorithm based on the training set for predicting, during an in-use phase the intent parameter indicative of an intent of the object on the terrain during an in-use target moment in time based on data indicative of (i) the terrain at the in-use target moment in time, (ii) an in-use state of the self-driving vehicle at the in-use target moment in time, and (iii) an in-use state of the object.

In some implementations retrieving includes retrieving, by the server, data indicative of (i) a set of previous states of the training vehicle prior to the target moment in time, and (ii) a set of previous states of the training object prior to the target moment in time. The input further includes the data indicative of the sets of previous states of the training vehicle and of the training object.

In some implementations the set of previous states of the training vehicle is a portion of a trajectory of the training vehicle prior to the target moment in time, the portion of the trajectory corresponding to a time interval of a predetermined length prior to the target moment in time. In some implementations the set of previous states of the training object is a portion of a trajectory of the training object prior to the target moment in time, the portion of the trajectory corresponding to a time interval of a predetermined length prior to the target moment in time.

In some implementations the retrieving includes retrieving, by the server, data indicative of (i) a set of future states of the training vehicle after the target moment in time including the future state of the training vehicle, and (ii) a set of future states of the training object after the target moment in time including the future state of the training object. The assessor-less label in these implementations may be based on the sets of future states of the training vehicle and of the training object. In some of these implementations the set of future states of the training vehicle is a portion of a trajectory of the training vehicle after the target moment in time, and the set of future states of the training object is a portion of an other trajectory of the training object after the target moment in time.

In some implementations the method further includes selecting, by the server, the target moment in time in the operational data. The selecting includes identifying, by the server, a given state of the training vehicle and a given state of the training object in the operational data that are associated with a same position on the training terrain, and selecting, by the server, the target moment in time as a preceding moment in time to a given moment in time associated with the given state of the training vehicle.

In some implementations the method includes generating, by the server, the assessor-less label based on the data indicative of the future states of the training vehicle and the training object. Generating the assessor-less label includes determining, by the server, that the future states of the training vehicle and the training object are indicative of at least one of: the training vehicle and the training object, after the target moment in time, occupied a same position on the training terrain and that the training vehicle occupied the same position before the training object; the training vehicle and the training object after the target moment in time, occupied the same position on the training terrain and that the training object occupied the same position before the training vehicle; the training vehicle and the training object, after the target moment in time, have not occupied the same position on the training terrain; and the training object occupied a given position on the training terrain at a future moment in time and that the training vehicle occupied an other given position on the training terrain at the future moment in time and a distance between the given position and the other given position is below a safety threshold distance.

In some implementations the method further includes transmitting, by the server, information representative of the machine learning algorithm to an electronic device associated with the self-driving vehicle. In these implementations, at the in-use target moment in time during operation of the self-driving vehicle, the method includes executing, by the electronic device, the machine learning algorithm for generating the intent parameter, and triggering, by the electronic device, operation of the self-driving vehicle at least in part based on the intent parameter.

In some implementations the machine learning algorithm is configured to classify an intent of the object, the intent parameter being indicative of a probability of the intent of the object to be one of a plurality of intent classes. In some implementations, the training vehicle is the self-driving vehicle. In some implementations, the object is a mobile object. In some implementations, the object is at least one of a vehicle and a pedestrian.

In some implementations, the training terrain includes a training road segment. The training terrain data may be representative of a bird-eye-view image of the training road segment at the target moment in time.

In accordance with other aspects of the present disclosure, a method of operating a self-driving vehicle is provided. The method includes receiving on an electronic device associated with the self-driving vehicle data from a sensor associated with the self-driving vehicle, the data indicative of a state of the self-driving vehicle, the state of an object in the vicinity of the self-driving vehicle, and the terrain on which the self-driving vehicle is moving. The method further includes providing the data to a machine learning algorithm on the electronic device, the machine learning algorithm determining an intent parameter indicative of an intent of the object on the terrain during a target moment in time, and triggering, by the electronic device, operation of the self-driving vehicle at least in part based on the intent parameter. The machine learning algorithm was trained using a training dataset generated, at least in part by: accessing, by a server, operational data associated with a training vehicle, the operational data having been previously stored in a storage, the operational data including data indicative of: a training terrain, states of the training vehicle on the training terrain, and states of a training object on the training terrain. Generating the training set further included, for a training target moment in time in the operational data, retrieving, by the server from the operational data, data indicative of: the training terrain at the training target moment in time, a target state of the training vehicle corresponding to the training target moment in time, and a future state of the training vehicle after the training target moment in time; and a target state of the training object corresponding to the training target moment in time, and a future state of the training object after the training target moment in time. Generating the training set further included generating, by the server, the training dataset for training the machine learning algorithm, the training dataset having an input and an assessor-less label, the input including the data indicative of the training terrain and of the target states of the training vehicle and the training object, and the assessor-less label being based on the data indicative of the future states of the training vehicle and the training object. The assessor-less label is indicative of an intent of the training object on the training terrain at the training target moment in time.

In some implementations of this aspect, the machine learning algorithm is configured to classify an intent of the object, the intent parameter being indicative of a probability of the intent of the object to be one of a plurality of intent classes. In some implementations of this aspect, the method further includes receiving on the electronic device information representative of the machine learning algorithm from a server.

In accordance with a further aspect of the present disclosure, the technology is implemented in a self-driving vehicle. The self-driving vehicle includes at least one sensor configured to collect sensor data indicative of a state of the self-driving vehicle, the state of an object in the vicinity of the self-driving vehicle, and the terrain on which the self-driving vehicle is moving. The self-driving vehicle further includes an electronic device including a processor and a memory. The memory stores programmed instructions that when executed by the processor cause the electronic device to: provide the sensor data to a machine learning algorithm executing on the processor, the machine learning algorithm determining an intent parameter indicative of an intent of the object on the terrain during a target moment in time; and trigger operation of the self-driving vehicle at least in part based on the intent parameter. The machine learning algorithm includes values stored in the memory that were determined by training the machine learning algorithm using a training dataset generated, at least in part by: accessing, by a server, operational data associated with a training vehicle, the operational data having been previously stored in a storage, the operational data including data indicative of: a training terrain, states of the training vehicle on the training terrain, and states of a training object on the training terrain. Generating the training set further included, for a training target moment in time in the operational data, retrieving, by the server from the operational data, data indicative of: the training terrain at the training target moment in time, a target state of the training vehicle corresponding to the training target moment in time, and a future state of the training vehicle after the training target moment in time; and a target state of the training object corresponding to the training target moment in time, and a future state of the training object after the training target moment in time. Generating the training set further included generating, by the server, the training dataset for training the machine learning algorithm, the training dataset having an input and an assessor-less label, the input including the data indicative of the training terrain and of the target states of the training vehicle and the training object, and the assessor-less label being based on the data indicative of the future states of the training vehicle and the training object. The assessor-less label is indicative of an intent of the training object on the training terrain at the training target moment in time.

In some implementations according to this aspect of the disclosure, the machine learning algorithm is configured to classify an intent of the object, the intent parameter being indicative of a probability of the intent of the object to be one of a plurality of intent classes. In some implementations according to this aspect, the memory further stores programmed instructions that when executed by the processor cause the electronic device to receive information representative of the machine learning algorithm from a server.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

DETAILED DESCRIPTION

Figure 1:
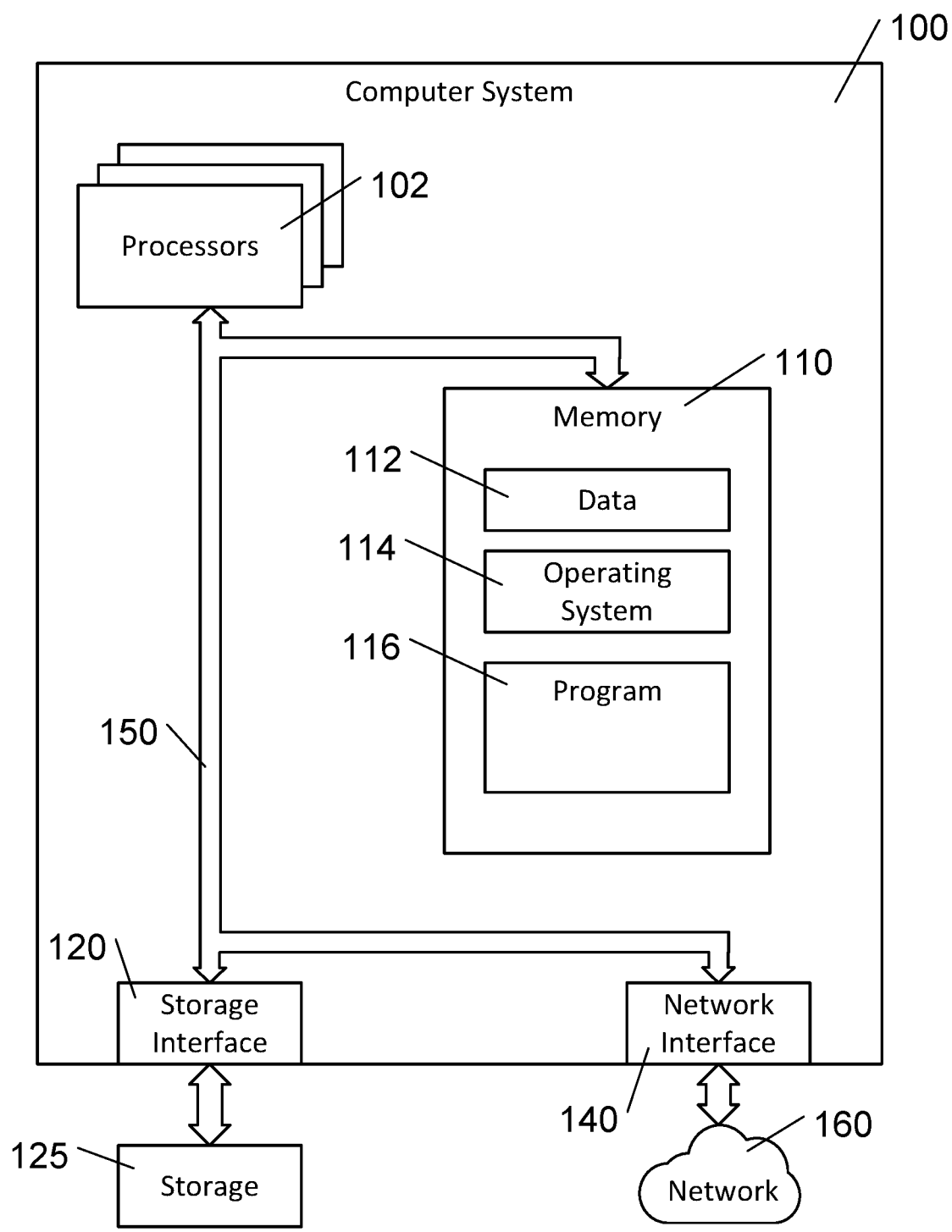
FIG. 1 depicts a schematic diagram of an example computer system for use in some implementations of systems and/or methods of the present technology.

Various representative implementations of the disclosed technology will be described more fully hereinafter with reference to the accompanying drawings. The present technology may, however, be implemented in many different forms and should not be construed as limited to the representative implementations set forth herein. In the drawings, the sizes and relative sizes of layers and regions may be exaggerated for clarity. Like numerals refer to like elements throughout.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

It will be understood that, although the terms first, second, third, etc. may be used herein to describe various elements, these elements should not be limited by these terms. These terms are used to distinguish one element from another. Thus, a first element discussed below could be termed a second element without departing from the teachings of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. By contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is only intended to describe particular representative implementations and is not intended to be limiting of the present technology. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The functions of the various elements shown in the figures, including any functional block labeled as a "processor," may be provided through the use of dedicated hardware as well as hardware capable of executing software. When provided by a processor, the functions may be provided by a single dedicated processor, by a single shared processor, or by a plurality of individual processors, some of which may be shared. In some implementations of the present technology, the processor may be a general-purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, an application-specific integrated circuit (ASIC), a field-programmable gate array (FPGA), a read-only memory (ROM) for storing software, a random-access memory (RAM), and non-volatile storage. Other hardware, conventional and/or custom, may also be included.

Software modules, or simply modules or units which are implied to be software, may be represented herein as any combination of flowchart elements or other elements indicating the performance of process steps and/or textual description. Such modules may be executed by hardware that is expressly or implicitly shown. Moreover, it should be understood that a module may include, for example, but without limitation, computer program logic, computer program instructions, software, stack, firmware, hardware circuitry, or a combination thereof, which provides the required capabilities.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

The present technology may be implemented as a system, a method, and/or a computer program product. The computer program product may include a computer-readable storage medium (or media) storing computer-readable program instructions that, when executed by a processor, cause the processor to carry out aspects of the disclosed technology. The computer-readable storage medium may be, for example, an electronic storage device, a magnetic storage device, an optical storage device, an electromagnetic storage device, a semiconductor storage device, or any suitable combination of these. A non-exhaustive list of more specific examples of the computer-readable storage medium includes: a portable computer disk, a hard disk, a random-access memory (RAM), a read-only memory (ROM), a flash memory, an optical disk, a memory stick, a floppy disk, a mechanically or visually encoded medium (e.g., a punch card or bar code), and/or any combination of these. A computer-readable storage medium, as used herein, is to be construed as being a non-transitory computer-readable medium. It is not to be construed as being a transitory signal, such as radio waves or other freely propagating electromagnetic waves, electromagnetic waves propagating through a waveguide or other transmission media (e.g., light pulses passing through a fiber-optic cable), or electrical signals transmitted through a wire.

It will be understood that computer-readable program instructions can be downloaded to respective computing or processing devices from a computer-readable storage medium or to an external computer or external storage device via a network, for example, the Internet, a local area network, a wide area network and/or a wireless network. A network interface in a computing/processing device may receive computer-readable program instructions via the network and forward the computer-readable program instructions for storage in a computer-readable storage medium within the respective computing or processing device.

Computer-readable program instructions for carrying out operations of the present disclosure may be assembler instructions, machine instructions, firmware instructions, configuration data for integrated circuitry, or either source code or object code written in any combination of one or more programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network.

All statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable program instructions. These computer-readable program instructions may be provided to a processor or other programmable data processing apparatus to generate a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowcharts, flow diagrams, state transition diagrams, pseudo-code, and the like.

The computer-readable program instructions may also be loaded onto a computer, other programmable data processing apparatus or other devices to cause a series of operational steps to be performed on the computer, other programmable apparatus or other devices to generate a computer-implemented process, such that the instructions which execute on the computer, other programmable apparatus, or other device implement the functions/acts specified in the flowcharts, flow diagrams, state transition diagrams, pseudo-code, and the like.

In some alternative implementations, the functions noted in flowcharts, flow diagrams, state transition diagrams, pseudo-code, and the like may occur out of the order noted in the figures. For example, two blocks shown in succession in a flowchart may, in fact, be executed substantially concurrently, or the blocks may sometimes be executed in the reverse order, depending upon the functionality involved. It will also be noted that each of the functions noted in the figures, and combinations of such functions can be implemented by special-purpose hardware-based systems that perform the specified functions or acts or by combinations of special-purpose hardware and computer instructions.

With these fundamentals in place, we will now consider some non-limiting examples to illustrate various implementations of aspects of the present disclosure.

Computer System

FIG. 1 shows a computer system 100. The computer system 100 may be a multi-user computer, a single user computer, a laptop computer, a tablet computer, a smartphone, an embedded control system, or any other computer system currently known or later developed. Additionally, it will be recognized that some or all the components of the computer system 100 may be virtualized and/or cloud-based. As shown in FIG. 1, the computer system 100 includes one or more processors 102, a memory 110, a storage interface 120, and a network interface 140. These system components are interconnected via a bus 150, which may include one or more internal and/or external buses (not shown) (e.g. a PCI bus, universal serial bus, IEEE 1394 "Firewire" bus, SCSI bus, Serial-ATA bus, etc.), to which the various hardware components are electronically coupled.

The memory 110, which may be a random-access memory or any other type of memory, may contain data 112, an operating system 114, and a program 116. The data 112 may be any data that serves as input to or output from any program in the computer system 100. The operating system 114 is an operating system such as MICROSOFT WINDOWS or LINUX. The program 116 may be any program or set of programs that include programmed instructions that may be executed by the processor to control actions taken by the computer system 100.

The storage interface 120 is used to connect storage devices, such as the storage device 125, to the computer system 100. One type of storage device 125 is a solid-state drive, which may use an integrated circuit assembly to store data persistently. A different kind of storage device 125 is a hard drive, such as an electro-mechanical device that uses magnetic storage to store and retrieve digital data. Similarly, the storage device 125 may be an optical drive, a card reader that receives a removable memory card, such as an SD card, or a flash memory device that may be connected to the computer system 100 through, e.g., a universal serial bus (USB).

In some implementations, the computer system 100 may use well-known virtual memory techniques that allow the programs of the computer system 100 to behave as if they have access to a large, contiguous address space instead of access to multiple, smaller storage spaces, such as the memory 110 and the storage device 125. Therefore, while the data 112, the operating system 114, and the programs 116 are shown to reside in the memory 110, those skilled in the art will recognize that these items are not necessarily wholly contained in the memory 110 at the same time.

The processors 102 may include one or more microprocessors and/or other integrated circuits. The processors 102 execute program instructions stored in the memory 110. When the computer system 100 starts up, the processors 102 may initially execute a boot routine and/or the program instructions that make up the operating system 114.

The network interface 140 is used to connect the computer system 100 to other computer systems or networked devices (not shown) via a network 160. The network interface 140 may include a combination of hardware and software that allows communicating on the network 160. In some implementations, the network interface 140 may be a wireless network interface. The software in the network interface 140 may include software that uses one or more network protocols to communicate over the network 160. For example, the network protocols may include TCP/IP (Transmission Control Protocol/Internet Protocol).

It will be understood that the computer system 100 is merely an example and that the disclosed technology may be used with computer systems or other computing devices having different configurations.

Networked Computing Environment

Figure 2:
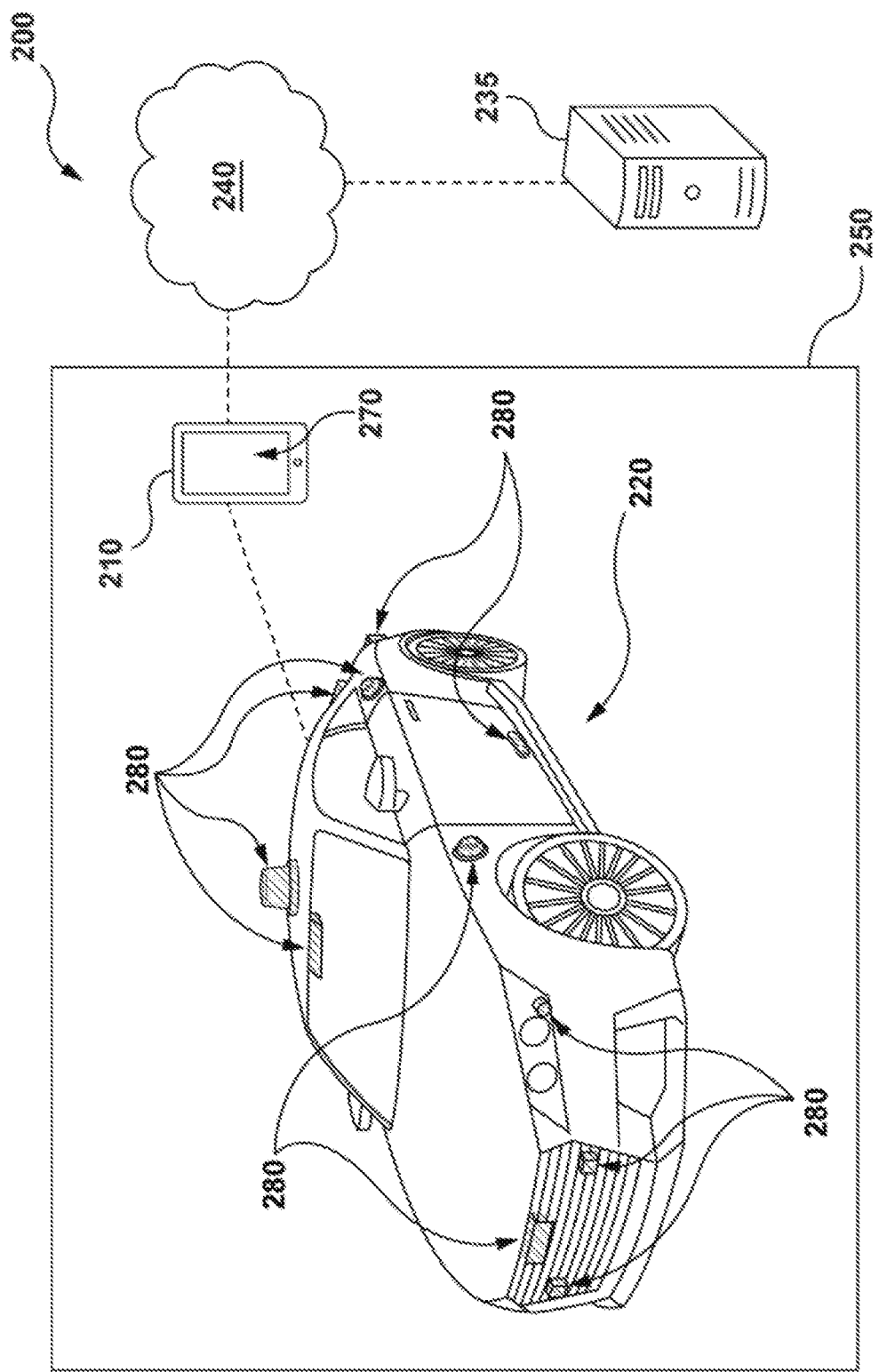
FIG. 2 depicts a networked computing environment including a self-driving vehicle, suitable for use with some implementations of the present technology.

FIG. 2 shows a networked computing environment 200 suitable for use with some non-limiting implementations of the present technology. The networked computing environment 200 includes an electronic device 210 associated with a vehicle 220 and/or associated with a user (not depicted) who is associated with the vehicle 220 (such as an operator of the vehicle 220). The environment 200 also includes a server 235 in communication with the electronic device 210 via a communication network 240 (e.g. the Internet or the like).

In at least some non-limiting implementations of the present technology, the electronic device 210 is communicatively coupled to control systems of the vehicle 220. The electronic device 210 could be arranged and configured to control different operations systems of the vehicle 220, including but not limited to: an ECU (engine control unit), steering systems, braking systems, and signaling and illumination systems (i.e. headlights, brake lights, and/or turn signals). In such an implementation, the vehicle 220 could be a self-driving vehicle 220.

In some non-limiting implementations of the present technology, the networked computing environment 200 could include a GPS satellite (not depicted) transmitting and/or receiving a GPS signal to/from the electronic device 210. It will be understood that the present technology is not limited to GPS and may employ a positioning technology other than GPS. It should be noted that the GPS satellite can be omitted altogether.

The vehicle 220, to which the electronic device 210 is associated, could be any transportation vehicle, for leisure or otherwise, such as a private or commercial car, truck, motorbike or the like. Although the vehicle 220 is depicted as being a land vehicle, this may not be the case in each and every non-limiting implementation of the present technology. For example, in certain non-limiting implementations of the present technology, the vehicle 220 may be a watercraft, such as a boat, or an aircraft, such as a flying drone.

The vehicle 220 may be user operated or a driver-less vehicle. In some non-limiting implementations of the present technology, it is contemplated that the vehicle 220 could be implemented as a Self-Driving Car (SDC). The self-driving vehicle 220 may be a fully self-driving vehicle, or a partially autonomous vehicle, in which a human driver controls some aspects of the vehicle's operation, while other aspects (e.g., "autopilot" on highways) are automated. It should be noted that specific parameters of the vehicle 220 are not limiting, these specific parameters including for example: vehicle manufacturer, vehicle model, vehicle year of manufacture, vehicle weight, vehicle dimensions, vehicle weight distribution, vehicle surface area, vehicle height, drive train type (e.g. 2× or 4×), tire type, brake system, fuel system, mileage, vehicle identification number, engine size, or other characteristics or parameters of a vehicle.

According to the present technology, the implementation of the electronic device 210 is not particularly limited. For example, the electronic device 210 could be implemented as a vehicle engine control unit, a vehicle CPU, a vehicle navigation device (e.g. TomTom™, Garmin™), a tablet, a personal computer built into the vehicle 220, and the like. Thus, it should be noted that the electronic device 210 may or may not be permanently associated with the vehicle 220. Additionally or alternatively, the electronic device 210 could be implemented in a wireless communication device such as a mobile telephone (e.g. a smartphone or a radio-phone). In certain implementations, the electronic device 210 has a display 270.

The electronic device 210 could include some or all of the components of the computer system 100 depicted in FIG. 1, depending on the particular implementation. In certain implementations, the electronic device 210 is an on-board computer device and includes the processors 102, the storage device 125 and the memory 110. In other words, the electronic device 210 includes hardware and/or software and/or firmware, or a combination thereof, for processing data as will be described in greater detail below.

In some non-limiting implementations of the present technology, the communication network 240 is the Internet. In alternative non-limiting implementations of the present technology, the communication network 240 can be implemented as any suitable local area network (LAN), wide area network (WAN), a private communication network or the like. It should be expressly understood that implementations for the communication network 240 are for illustration purposes only. A communication link (not separately numbered) is provided between the electronic device 210 and the communication network 240, the implementation of which will depend, inter alia, on how the electronic device 210 is implemented. Merely as an example and not as a limitation, in those non-limiting implementations of the present technology where the electronic device 210 is implemented as a wireless communication device such as a smartphone or a navigation device, the communication link can be implemented as a wireless communication link. Examples of wireless communication links may include, but are not limited to, a 3G communication network link, a 4G communication network link, and the like. The communication network 240 may also use a wireless connection with the server 235.

In some implementations of the present technology, the server 235 is implemented as a computer server and could include some or all of the components of the computer system 100 of FIG. 1. In one non-limiting example, the server 235 is implemented as a Dell™ PowerEdge™ Server running the Microsoft™ Windows Server™ operating system, but can also be implemented in any other suitable hardware, software, and/or firmware, or a combination thereof. In the depicted non-limiting implementations of the present technology, the server 235 is a single server. In alternative non-limiting implementations of the present technology, the functionality of the server 235 may be distributed and may be implemented via multiple servers (not shown).

In some non-limiting implementations of the present technology, the processors 102 of the electronic device 210 could be in communication with the server 235 to receive one or more updates. Such updates could include, but are not limited to, software updates, map updates, routes updates, weather updates, and the like. In some non-limiting implementations of the present technology, the electronic device 210 can also be configured to transmit to the server 235 certain operational data, such as routes traveled, traffic data, performance data, and the like. Some or all such data transmitted between the vehicle 220 and the server 235 may be encrypted and/or anonymized.

It should be noted that a variety of sensors and systems may be used by the electronic device 210 for gathering information about surroundings 250 of the vehicle 220. As seen in FIG. 2, the vehicle 220 may be equipped with a plurality of sensor systems 280. It should be noted that different sensor systems from the plurality of sensor systems 280 may be used for gathering different types of data regarding the surroundings 250 of the vehicle 220.

In one example, the plurality of sensor systems 280 may include various optical systems including, inter alia, one or more camera-type sensor systems that are mounted to the vehicle 220 and communicatively coupled to the processors 102 of the electronic device 210. Broadly speaking, the one or more camera-type sensor systems may be configured to gather image data about various portions of the surroundings 250 of the vehicle 220. In some cases, the image data provided by the one or more camera-type sensor systems could be used by the electronic device 210 for performing object detection procedures. For example, the electronic device 210 could be configured to feed the image data provided by the one or more camera-type sensor systems to an Object Detection Neural Network (ODNN) that has been trained to localize and classify potential objects in the surroundings 250 of the vehicle 220.

In another example, the plurality of sensor systems 280 could include one or more radar-type sensor systems that are mounted to the vehicle 220 and communicatively coupled to the processors 102. Broadly speaking, the one or more radar-type sensor systems may be configured to make use of radio waves to gather data about various portions of the surroundings 250 of the vehicle 220. For example, the one or more radar-type sensor systems may be configured to gather radar data about potential objects in the surroundings 250 of the vehicle 220, such data potentially being representative of a distance of objects from the radar-type sensor system, orientation of objects, velocity and/or speed of objects, and the like.

In a further example, the plurality of sensor systems 280 could include one or more LIDAR systems that are mounted to the vehicle 220 and communicatively coupled to the processors 102. Broadly speaking, a LIDAR system is configured to capture data about the surroundings 250 of the vehicle 220 used, for example, for building a multi-dimensional map of objects in the surroundings 250 of the vehicle 220. The LIDAR system could be mounted, or retrofitted, to the vehicle 220 in a variety of locations and/or in a variety of configurations for gathering information about surroundings 250 of the vehicle 220.

For example, depending on the implementation of the vehicle 220 and the LIDAR system, the LIDAR system could be mounted on an interior, upper portion of a windshield of the vehicle 220. Nevertheless, other locations for mounting the lidar system are within the scope of the present disclosure, including on a back window, side windows, front hood, rooftop, front grill, front bumper or the side of the vehicle 220.

In the context of the present technology, the electronic device 210 is configured to detect one or more objects in the surroundings 250 of the vehicle 220 based on data acquired from one or more camera systems and from one or more LIDAR systems. For example, the electronic device 210 configured to detect a given object in the surroundings 250 of the vehicle 220 may be configured to identify LIDAR data and camera data associated with the given object, generate an "embedding" representative of features associated with the given object, and detect the object by generating a bounding box for the object.

Training a Machine Learning Algorithm

As has been noted above, machine learning algorithms should be trained prior to being used. For many machine learning algorithms, this training is performed using a large pre-labeled training dataset. Preparing such a pre-labeled training dataset can be time-consuming and expensive, particularly if the labels for each item in the dataset are human-generated. Thus, in accordance with various implementations of the present technology, a method for automatically generating a training dataset for a machine learning algorithm for use with a self-driving vehicle is described. This training dataset may be generated using pre-collected data from a training vehicle, which may be operated by a human driver. By analyzing the data collected by the training vehicle, labels may be automatically generated and added to the data collected by the training vehicle to generate a training dataset.

Figure 3:
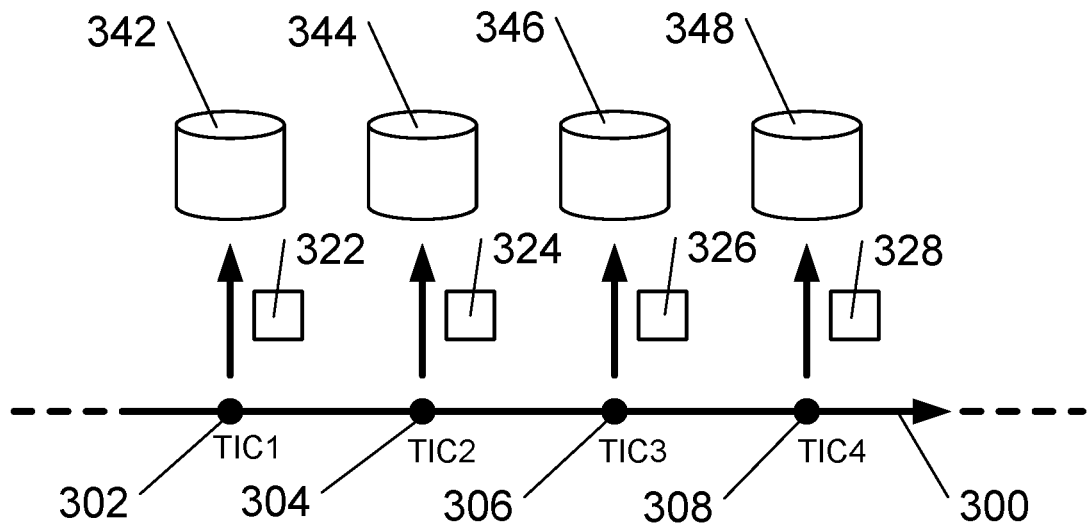
FIG. 3 shows a timeline view of the process of gathering data by a training vehicle.

FIG. 3 shows a timeline view of the process of gathering data by a training vehicle (not shown), which may be operated by a human operator (not shown) or may be partially or fully automated. At each point in time (referred to as a "tic" of a process), the training vehicle collects an operational data item that includes data indicative of a training terrain, a state of the training vehicle on the training terrain, and a state of a training object on the training terrain. The operational data item is then transferred to storage, which may include a database. Thus, as shown on the timeline 300, while the training vehicle is being operated, at each of tic1 302 through tic4 308, data are gathered for an operational data item 322-328, which is transferred to storage 342-348. While the timeline 300 shows only four tics 302-308, it will be understood that this data gathering process may continue during the entire period of operation of the training vehicle, with an additional operational data item being collected and stored at each "tic" during that period.

In some implementations, the tics, such as tics 302-308 my occur at predetermined regular time intervals. For example, the tics could be 100 ms apart, so there would be 10 tics per second. However, the tics need not always be separated by equal periods of time. For example, in some implementations, the spacing in time between tics could depend on a parameter of the vehicle, such as the velocity of the vehicle. Thus, when the vehicle is traveling at a high velocity, there may be less time between tics than when the vehicle is traveling at a low velocity.

In some implementations, the operational data items 322-328 may each include data on the training terrain, the state of the training vehicle, and the state of the training object. In some implementations, these data may be separated into multiple datasets, such as a training vehicle dataset, a training object dataset, and a training terrain dataset.

The data on the state of the training vehicle may include a variety of information, including, for example, the position of the training vehicle during a tic, as well as other information on the state of the training vehicle, such as the velocity of the training vehicle, the direction or steering angle, the state of the accelerator, the braking state, and other such information.

In some implementations, the training terrain may be part of the operational data item for each tic, while in some implementations, the same training terrain data may be used for multiple tics. In some implementations, the training terrain data may be data on terrain as sensed by the sensors on the training vehicle. In some implementations, the training terrain data may be map data or data representative of a birds-eye-view of the training terrain.

In some implementations, the state of the training object may include a position of the training object during a tic, and may include other data, such as a velocity and a direction of the training object. In some implementations, the state of the training object may be represented by data collected by the sensors of the training vehicle. It will be understood that the training object will generally be a moving object of concern when operating a self-driving vehicle, such as a pedestrian, cyclist, or another vehicle. It will further be understood that while the examples show only a single training object, in some implementations, there may be multiple training objects on the training terrain in the vicinity of the training vehicle.

In at least some embodiments of the present technology, it can be said that the operational data items may include trajectory data associated with the training vehicle. Broadly speaking, trajectory data represents a trajectory that the training vehicle follows on a training road segment. It is contemplated that the trajectory data may include a plurality states of the training vehicle during operation and which are associated with respective timestamps.

In some implementations, storage 342-348 may be storage on the same storage device or in the same database. In some implementations, storage 342-348 may each be a different record in a single database or in multiple databases. It will be understood that storage 342-348 may be on a storage device or database local to the training vehicle, or may be external to the training vehicle, such as network or cloud-based storage. It will further be understood that all or part of the operational data may be transferred from storage 342-348 onto a server or another system for use in training a machine learning algorithm.

Figure 4:
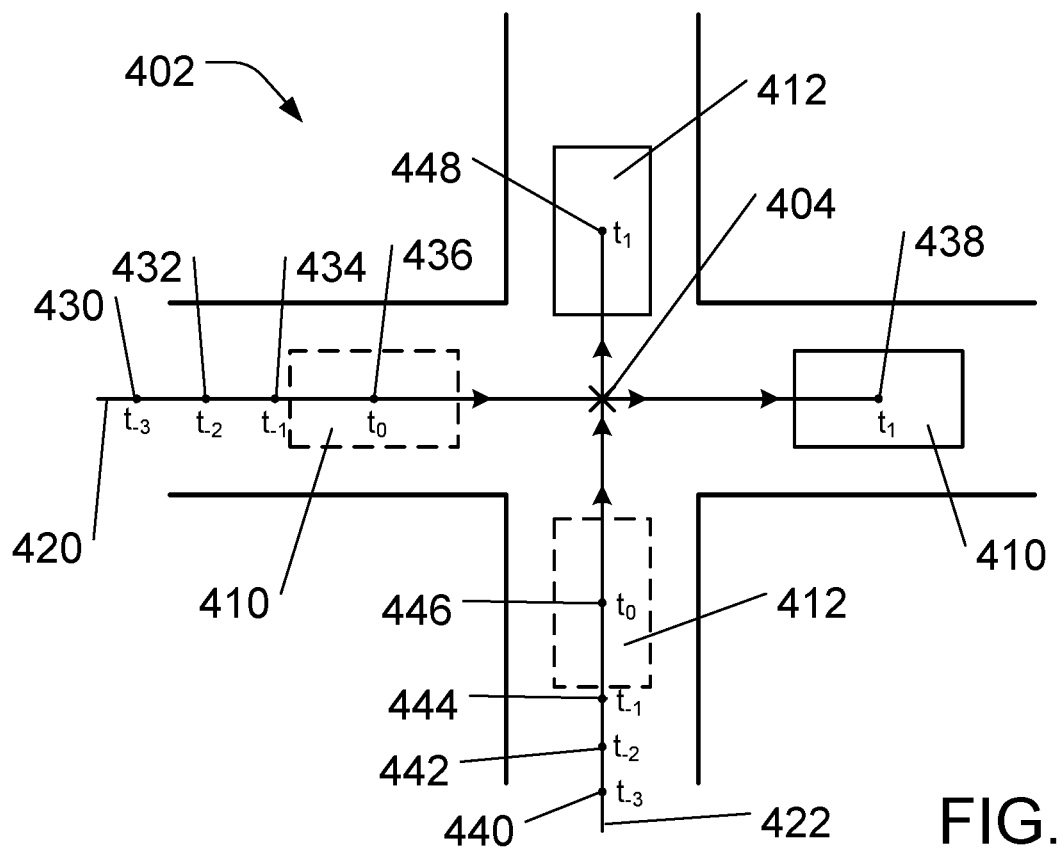
FIG. 4 depicts an example scenario of data collection by a training vehicle on a training terrain.

FIG. 4 shows an example scenario of data collection by a training vehicle 410 on a training terrain 402. The training terrain 402 shown in the example of FIG. 4 includes a road segment forming a four-way intersection or crossroads. In the example shown in FIG. 4, the training vehicle 410 and a training object 412 (in this example, another vehicle) arrive at the intersection at similar points in time. The training vehicle 410 crosses the intersection first.

In the example shown in FIG. 4, the training vehicle 410 and the training object 412 are shown as rectangles that represent bounding boxes of the training vehicle 410 and the training object 412. In some implementations the positions of the training vehicle 410 and the training object 412, as well as the distance between them, may be determined using bounding boxes.

Line 420 shows the trajectory of the training vehicle, and line 422 shows the trajectory of the training object. Points 430, 432, 434, 436, and 438 show the positions of the training vehicle 410 at times $t_{-3}$, $t_{-2}$, $t_{-1}$, $t_0$, and $t_1$, respectively. Each of these represents vehicle position during a respective "tic," as discussed above. Similarly points 440, 442, 444, 446, and 448 show the positions of the training object 412 at times $t_{-3}$, $t_{-2}$, $t_{-1}$, $t_0$, and $t_1$, respectively. As can be seen, the paths of the training vehicle 410 and the training object 412 cross at a point 404.

The goal of the training data that is being collected by the training vehicle 410 is to train a machine learning algorithm to determine an intent parameter of a training object, such as the training object 412 at a target moment in time. In the example shown in FIG. 4, the target moment in time is time $t_0$, so the state at time $t_0$ and any time prior to time $t_0$ may be used to form a training dataset, while the state at time $t_1$ and any future times can be used to label the training dataset with the appropriate intent parameter for what actually happened in the training scenario.

In some implementations, states of the training vehicle 410 prior to the target moment in time may be used to determine a trajectory or a portion of a trajectory of the training vehicle 410 over a time interval of predetermined length prior to the target moment in time. Similarly, in some implementations, states of the training object 412 prior to the target moment in time may be used to determine a trajectory or a portion of a trajectory of the training object 412 over a time interval of predetermined length prior to the target moment in time.

In some implementations, the training vehicle simply records data for each tic. After the data are recorded, the data may be analyzed on a server (for example, the recorded data may be transmitted to the server once training operation of the training vehicle is terminated) to determine appropriate target moments in time for use in the training dataset. This may by done, for example, by finding states of the training vehicle and training object in the recorded data at which the training vehicle and the training object occupied the same position or were within a predetermined safety threshold distance of each other at close proximity in time, such as within the duration of a single tic or a small number of tics. The target moment in time can then be found by backing up to a preceding moment in time, before the training vehicle occupied that position. It should be noted that although this may be done on a server at any time after recording the data, in some implementations, the training vehicle may mark certain operational data items as more likely to be near such target moments in time as the data are being recorded.

Thus, as can be seen in FIG. 4, the training vehicle 410 and the training object 412 both occupied the point 404 in the training terrain 402 during the interval between $t_0$ and $t_1$. Backing up to the nearest tic prior to this identifies $t_0$ as the target moment in time for training. Once this is established, the server may use data from $t_0$ and zero or more tics prior to $t_0$ to generate training sets, and data from $t_1$ and zero or more tics subsequent to $t_1$ to generate an assessor-less label representing an intent parameter on the training object. In some implementations, the training data may be divided into a dataset for the training vehicle, a dataset for the training object, and a dataset for the training terrain.

Once the target moment in time has been identified, the server may also generate an assessor-less label for the training dataset, based on one or more future states—i.e., states that occur after the target moment in time—of the training vehicle and the training object. The assessor-less label is representative of the intent of the training object at the target moment in time. In other words, the one or more future states is used as the label indicative of the intent at the target moment in time.

In some implementations, the assessor-less label may be selected from a set of predetermined future states for the training object. For example, in some implementations, the predetermined future states for the training object may be:

the training vehicle and the training object, after the target moment in time, occupied a same position on the training terrain and that the training vehicle occupied the same position before the training object;

the training vehicle and the training object, after the target moment in time, occupied the same position on the training terrain and that the training object occupied the same position before the training vehicle;

the training vehicle and the training object, after the target moment in time, have not occupied the same position on the training terrain (e.g., "no interaction" examples for training purposes); and the training object occupied a given position on the training terrain at a future moment in time and that the training vehicle occupied an other given position on the training terrain at the future moment in time and a distance between the given position and the other given position is below a safety threshold distance.

Thus, in the example shown in FIG. 4, the assessor-less label that the system would generate based on the states of the training vehicle 410 and the training object 412 in the training terrain 402 at time t1 (and possibly subsequent times) would be that the training vehicle and the training object, after the target moment in time, occupied a same position on the training terrain and that the training vehicle occupied the same position before the training object. In some implementations, this assessor-less label may be represented by a vector, with each of the predetermined future states being represented by one value in the vector. For example, the assessor-less label for the example shown in FIG. 4 may be represented by the vector (1, 0, 0, 0).

It will be understood that although the scenario shown in FIG. 4 is based on the training vehicle and the training object crossing an intersection, this is only for illustration. Many other scenarios and training datasets with assessor-less labels would be needed to train a machine learning algorithm to predict an intent parameter of an object on a terrain. For example, there may be many training scenarios involving the training vehicle and the training object traveling near each other in different lanes on the same road, with the training object and/or training vehicle changing lanes. Many other training scenarios may also be used.

Figure 5:
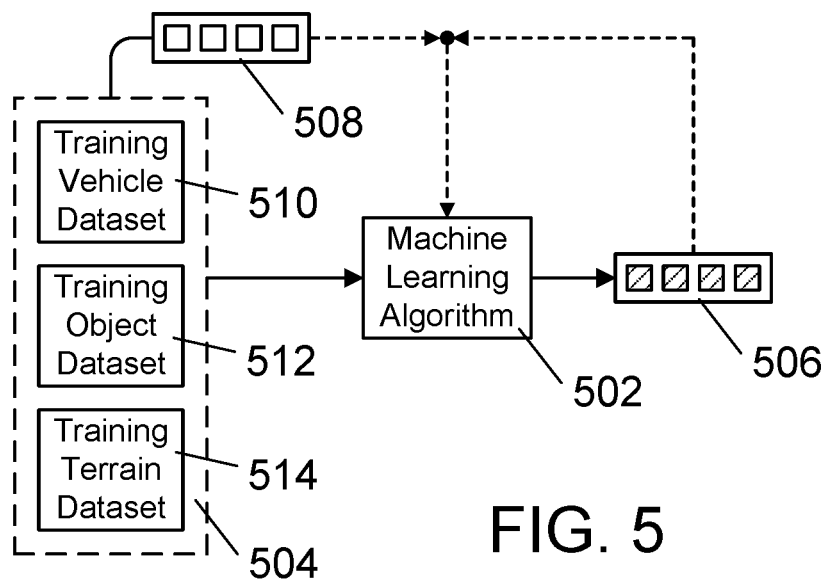
FIG. 5 depicts a process of training a machine learning algorithm using operational data collected by a training vehicle.

Referring now to FIG. 5, a method for training a machine learning algorithm 502 is described. This training will generally occur on a server, from the stored operational data from many training runs of a training vehicle. As shown in FIG. 5, a training data item 504 is sent to the machine learning algorithm 502, which generates a prediction 506 of an intent parameter of the training object. The prediction 506 is then compared to the assessor-less label 508 that is associated with the training data item 504 (the generation of which is described above), and the difference between the prediction 506 and the assessor-less label 508 is then used to train the machine learning algorithm 502.

In some implementations, the training data item 504 may include a training vehicle dataset 510, representing the state of the training vehicle at a target moment in time and at zero or more times prior to the target moment in time, a training object dataset 512, representing the state of the training object at the target moment in time and at zero or more times prior to the target moment in time, and a training terrain dataset 514, representing the training terrain at the target moment in time and at zero or more times prior to the target moment in time. In some implementations, the overall training dataset may include tens of thousands, hundreds of thousands, or even millions of such training items and their associated assessor-less labels. In some implementations of the present technology, the training data item 504 may include the training vehicle dataset 510, representing the states of the training vehicle at a target moment in time and for 8 seconds prior to the target moment in time.

As discussed above, in some implementations, the assessor-less label may be represented by a vector, with each value in the vector representing one of a predetermined number of states of the training vehicle and the training object at a time after the target moment in time. This vector is representative of an intent parameter of the training object. Similarly, in some implementations, the prediction 506 may be represented by a similar vector, with each value in the vector representing a predicted probability (generally between zero and one) for each of the predetermined number of states of the training vehicle and the training object at a time after the target moment in time (which may be referred to herein as "intent classes").

The machine learning algorithm 502 may be any suitable conventional machine learning algorithm. For example, the machine learning algorithm may be any of various conventional machine learning algorithms, including, without limitation, "deep learning" algorithms, other types of neural networks or "connectionist" systems, decision trees, decision forests, Bayesian networks, or other known or later developed machine learning algorithms that use training datasets (e.g., supervised or semi-supervised learning algorithms). The manner in which the prediction 506, the assessor-less label 508, and/or a difference between them is used to train the machine learning algorithm 502 will vary according to the machine learning algorithm that is used.

Once the machine learning algorithm 502 has been trained, information representative of the machine learning algorithm may be sent to an electronic device associated with a self-driving vehicle, such as the electronic device 210, discussed above with reference to FIG. 2. The machine learning algorithm may then be used in controlling the self-driving vehicle.

Using a Trained Machine Learning Algorithm

Figure 6:
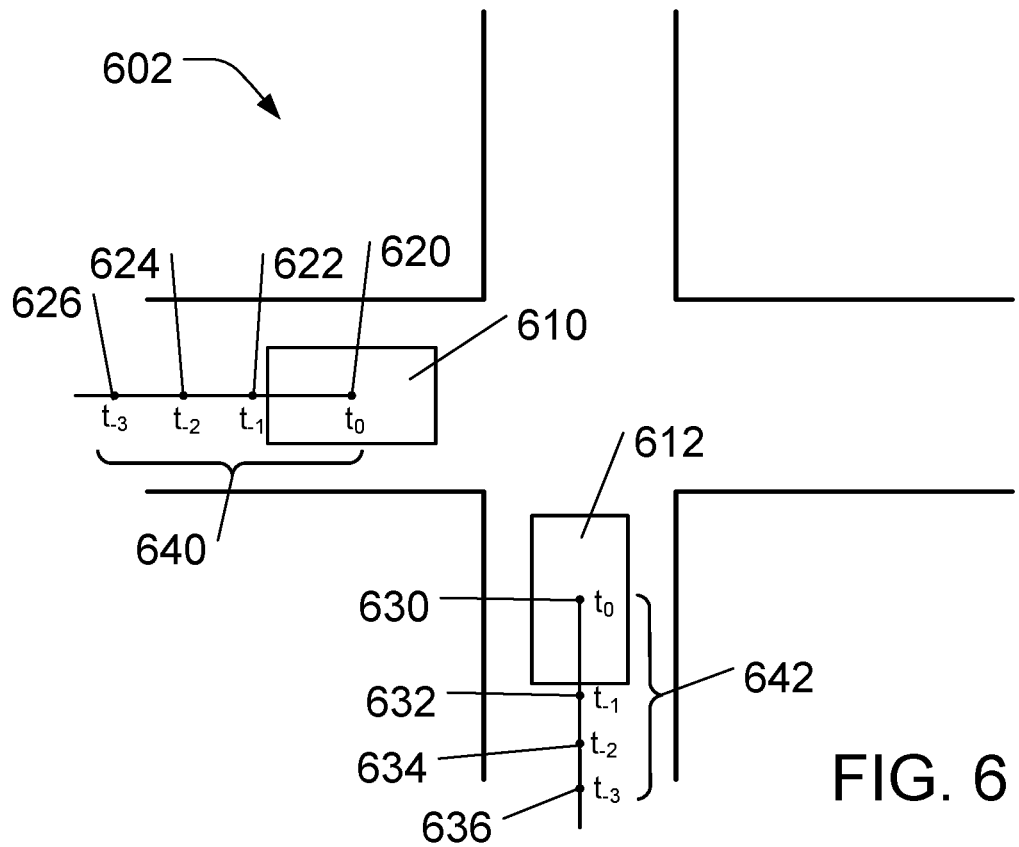
FIG. 6 shows an example scenario for the machine learning algorithm in use in a self-driving vehicle.

FIG. 6 shows an example scenario for the machine learning algorithm in use in a self-driving vehicle. As in FIG. 4, the terrain 602 includes a four-way intersection or crossroads. A self-driving vehicle 610, including the trained machine learning algorithm, and an object 612 are both approaching the intersection. The self-driving vehicle 610 uses sensors (not shown) to determine its own state and the detected state of the object 612 at each tic, and stores at least enough previous data to apply the machine learning algorithm to predict an intent parameter of the object in the terrain. For example, if the machine learning algorithm was trained to use data from a target moment in time and two previous tics, then the self-driving vehicle 610 will keep state information on at least the most recent three tics, so the machine learning algorithm may be applied. In the example shown in FIG. 4, the self-driving vehicle 610 has data on the state of the self-driving vehicle 610 and on the state of the object 612 for at least times $t_0$, $t_{-1}$, $t_{-2}$, and $t_{-3}$. The sensors also provide information on the terrain 602. In some implementations, this terrain data is recorded at each tic. In some implementations the terrain data may be recorded less often than the state data. In some implementations, the terrain data may include predetermined map data, in addition to data provided by the sensors on the self-driving vehicle 610.

The data on the state of the self-driving vehicle 610 may include information such as the position of the self-driving vehicle 610 during a tic, as well as other information on the state of the self-driving vehicle 610, such as the velocity, direction or steering angle, the state of the accelerator, the braking state, and other information. The data on the state of the object 612 may include sensor information indicating the position, as well as other sensed information on the state of the object 612, such as the velocity and direction of the object 612. As discussed above with reference to FIG. 4, current and past states of the self-driving vehicle 610 and the object 612 may be used in some implementations to determine their trajectories or portions of their trajectories corresponding to a time interval of a predetermined length prior to the target moment in time.

In FIG. 6, points 620, 622, 624, and 626 show the position of the self-driving vehicle 610 at times $t_0$, $t_{-1}$, $t_{-2}$, and $t_{-3}$, respectively. Information on the state of the self-driving vehicle 610 at each of these times, and possibly previous times, forms an in-use dataset 640 for the self-driving vehicle. Points 630, 632, 634, and 636 show the position of the object 612 at times $t_0$, $t_{-1}$, $t_{-2}$, and $t_{-3}$, respectively. Information on the state of the object 612 at each of these times, and possibly previous times, forms an in-use dataset 642 for the object. An in-use dataset (not shown) for the terrain 602 can also be formed in the self-driving vehicle 610.

These in-use datasets may be used by the trained machine learning algorithm to generate a predicted intent parameter for the object 612 in the terrain 602. The self-driving vehicle 610 may then take an action based on this predicted intent parameter.

Figure 7:
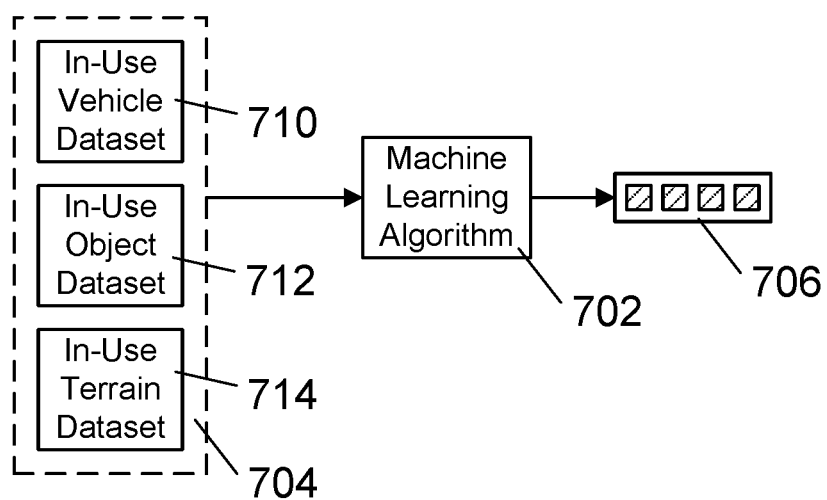
FIG. 7 depicts the generation of a predicted intent parameter for an object by a trained machine learning algorithm using in-use data.

FIG. 7 shows the generation of a predicted intent parameter for an object by a trained machine learning algorithm 702. An in-use data item 704 is sent to the trained machine learning algorithm 702, which generates a predicted intent parameter 706 for an object.

The in-use data item 704 includes the most recent data on the state of the self-driving vehicle, on the state of the object, and on the terrain. In some implementations, the in-use data item 704 may include an in-use dataset 710 for the self-driving vehicle, an in-use dataset 712 for the object, and an in-use dataset 714 for the terrain. As discussed above, each of these in-use datasets may include data for the target moment in time, as well as for zero or more previous times, depending on the trained machine learning algorithm.

In some implementations, the predicted intent parameter 706 may be represented by a vector, with each value in the vector representing a predicted probability (generally between zero and one) for each of the predetermined number of states of the self-driving vehicle and the object at a time after the target moment in time (which may be referred to herein as "intent classes"). This vector provides a prediction of the intent of the object in the immediate future, and may be used to determine actions to be taken by the self-driving vehicle, e.g., to avoid a collision or other undesirable event.

The trained machine learning algorithm 702 may be any suitable conventional machine learning algorithm that has been trained as discussed above. For example, the machine learning algorithm may be any of various conventional machine learning algorithms, including, without limitation, "deep learning" algorithms, other types of neural networks or "connectionist" systems, decision trees, decision forests, Bayesian networks, or other known or later developed machine learning algorithms.

Overview of a Method for Training and Using a Machine Learning Algorithm

Figure 8:
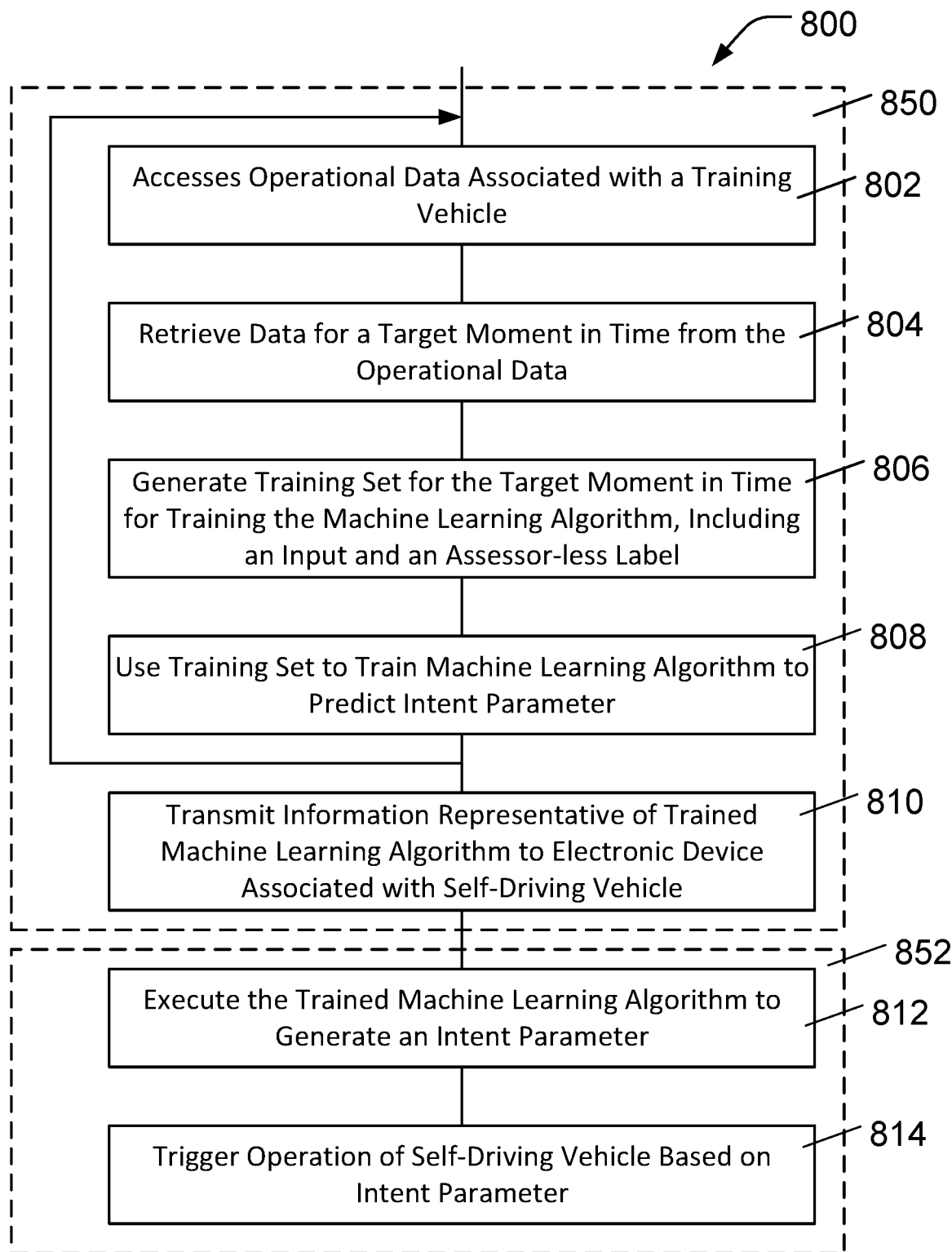
FIG. 8 shows a flowchart of a method for training a machine learning algorithm for predicting an intent parameter of an object on a terrain, and for using the trained machine learning algorithm.

Referring now to FIG. 8, a flowchart 800 of a method for training a machine learning algorithm for predicting an intent parameter of an object on a terrain in accordance with the present technology is described. The method is split into two phases: a training phase 850, and an in-use phase 852. The training phase 850 is generally executable by a server, while the in-use phase is executable on an electronic device associated with a self-driving vehicle, such as the electronic device 210, as described with reference to FIG. 2.

In block 802 of the training phase 850, the server accesses operational data associated with a training vehicle, the operational data including data indicative of a training terrain, states of the training vehicle on the training terrain, and states of a training object on the training terrain. The operational data may have been previously stored in storage, such as a storage device or database.

In block 804 of the training phase 850, the server retrieves data for a target moment in time from the operational data. The retrieved data are indicative of: the training terrain at the target moment in time; a target state of the training vehicle corresponding to the target moment in time, and a future state of the training vehicle after the target moment in time; and a target state of the training object corresponding to the target moment in time, and a future state of the training object after the target moment in time.

In some implementations, the server selects the target moment in time in the data by identifying a given state of the training vehicle and a given state of the training object in the operational data that are associated with a same position on the training terrain. The server may then select the target moment in time as a preceding moment in time to a given moment in time associated with the given state of the training vehicle.

In some implementations, retrieving the data for the target moment in time from the operational data includes retrieving data indicative of a set of previous states of the training vehicle prior to the target moment in time. Retrieving the data may also include retrieving a set of previous states of the training object prior to the target moment in time. In some implementations, the set of previous states of the training vehicle is a portion of a trajectory of the training vehicle prior to the target moment in time, the portion of the trajectory corresponding to a time interval of a predetermined length prior to the target moment in time. In some implementations the set of previous states of the training object is a portion of a trajectory of the training object prior to the target moment in time, the portion of the trajectory corresponding to a time interval of a predetermined length prior to the target moment in time.

In some implementations, retrieving the data includes retrieving data indicative of a set of future states of the training vehicle after to the target moment in time including the future state of the training vehicle, and a set of future states of the training object after the target moment in time including the future state of the training object. In some implementations, the set of future states of the training vehicle is a portion of a trajectory of the training vehicle after the target moment in time, and the set of future states of the training object is a portion of a trajectory of the training object after the target moment in time.

In block 806 of the training phase 850, the server generates a training set for the target moment in time for training the machine learning algorithm, the training set having an input and an assessor-less label. The input includes the data indicative of the training terrain and of the states of the training vehicle and the training object at the target moment in time. The assessor-less label is based on the data indicative of the future states of the training vehicle and the training object. The assessor-less label is indicative of an intent of the training object on the training terrain at the target moment in time.

In some implementations, the server generates the assessor-less label based on the data indicative of the future states of the training vehicle and the training object. In some implementations, generating the assessor-less label may include determining that the future states of the training vehicle and the training object are indicative of at least one of: the training vehicle and the training object, after the target moment in time, occupied a same position on the training terrain and that the training vehicle occupied the same position before the training object; the training vehicle and the training object after the target moment in time, occupied the same position on the training terrain and that the training object occupied the same position before the training vehicle; the training vehicle and the training object, after the target moment in time, have not occupied the same position on the training terrain; and the training object occupied a given position on the training terrain at a future moment in time and that the training vehicle occupied an other given position on the training terrain at the future moment in time and a distance between the given position and the other given position is below a safety threshold distance.

In at least some embodiments, it should be noted that at least some training examples generated by the server for training the machine learning algorithm may comprise "no interaction" examples between the training vehicle and the training object. In some cases, if the training examples have only "interaction" examples between the training vehicle and the training object, the machine learning algorithm may predict intents parameters that are always indicative of some interaction between an in-use vehicle and an in-use object, and which may not be the case.

In block 808 of the training phase 850, the server trains the machine learning algorithm based on the training set for predicting, during an in-use phase, the intent parameter indicative of the intent of the object on the terrain during an in-use target moment in time. The machine learning algorithm is trained to base this prediction on data indicative of the terrain at the in-use target moment in time, an in-use state of the self-driving vehicle at the in-use target moment in time, and an in-use state of the object at the in-use target moment in time.

Blocks 802-808 may be repeated until the accuracy of the predictions of the machine learning algorithm reaches a predetermined sufficient level of accuracy. Once this level of accuracy of prediction has been reached, at block 810 of the training phase, the server transmits information representative of the trained machine learning algorithm to an electronic device associated with the self-driving vehicle.

In block 812 of the in-use phase 852, the electronic device associated with the self-driving vehicle executes the trained machine learning algorithm to generate an intent parameter of an object. Generating the intent parameter is based on data indicative of the terrain at an in-use target moment in time, an in-use state of the self-driving vehicle at the in-use target moment in time, and an in-use state of the object at the in-use target moment in time. In some implementations, the intent parameter is indicative of a probability of the intent of the object to be one of a plurality of intent classes, and the machine learning algorithm is configured to classify an intent of the object into the plurality of intent classes.

In block 814 of the in-use phase 852, the electronic device triggers operation of the self-driving vehicle at least in part based on the intent parameter.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method of training a machine learning algorithm for predicting an intent parameter for an object on a terrain, a self-driving vehicle traveling on the terrain in proximity to the object, the method being executable by a server, the method comprising:
   accessing, by the server, operational data associated with a training vehicle, the operational data having been previously stored in a storage, the operational data including data indicative of:
      a training terrain, states of the training vehicle on the training terrain, and states of a training object on the training terrain;
   for a target moment in time in the operational data:
   retrieving, by the server from the operational data, data indicative of:
      the training terrain at the target moment in time,
      a target state of the training vehicle corresponding to the target moment in time, and a future state of the training vehicle after the target moment in time,
      a target state of the training object corresponding to the target moment in time, and a future state of the training object after the target moment in time;
   generating, by the server, a training set for training the machine learning algorithm, the training set having an input and an assessor-less label,
      the input including the data indicative of the training terrain and of the target states of the training vehicle and the training object,
      the assessor-less label being based on the data indicative of the future states of the training vehicle and the training object, the assessor-less label being indicative of an intent of the training object on the training terrain at the target moment in time; and
   training, by the server, the machine learning algorithm based on the training set for predicting, during an in-use phase:
      the intent parameter indicative of an intent of the object on the terrain during an in-use target moment in time based on data indicative of (i) the terrain at the in-use target moment in time, (ii) an in-use state of the self-driving vehicle at the in-use target moment in time, and (iii) an in-use state of the object;
   triggering operation of the self-driving vehicle at least in part based on the intent parameter.

2. The method of claim 1, wherein the retrieving comprises:
   retrieving, by the server, data indicative of (i) a set of previous states of the training vehicle prior to the target moment in time, and (ii) a set of previous states of the training object prior to the target moment in time,
   the input further including the data indicative of the sets of previous states of the training vehicle and of the training object.

3. The method of claim 2, wherein the set of previous states of the training vehicle is a portion of a trajectory of the training vehicle prior to the target moment in time, the portion of the trajectory corresponding to a time interval of a predetermined length prior to the target moment in time.

4. The method of claim 2, wherein the set of previous states of the training object is a portion of a trajectory of the training object prior to the target moment in time, the portion of the trajectory corresponding to a time interval of a predetermined length prior to the target moment in time.

5. The method of claim 1, wherein the retrieving comprises:
   retrieving, by the server, data indicative of (i) a set of future states of the training vehicle after the target moment in time including the future state of the training vehicle, and (ii) a set of future states of the training object after the target moment in time including the future state of the training object,
   the assessor-less label being based on the sets of future states of the training vehicle and of the training object.

6. The method of claim 5, wherein the set of future states of the training vehicle is a portion of a trajectory of the training vehicle after the target moment in time, and wherein the set of future states of the training object is a portion of an other trajectory of the training object after the target moment in time.

7. The method of claim 1, wherein the method further comprises selecting, by the server, the target moment in time in the operational data, the selecting comprising:
   identifying, by the server, a given state of the training vehicle and a given state of the training object in the operational data that are associated with a same position on the training terrain; and
   selecting, by the server, the target moment in time as a preceding moment in time to a given moment in time associated with the given state of the training vehicle.

8. The method of claim 1, wherein the method comprises generating, by the server, the assessor-less label based on the data indicative of the future states of the training vehicle and the training object, the generating the assessor-less label including:
   determining, by the server, that the future states of the training vehicle and the training object are indicative of at least one of:
      the training vehicle and the training object, after the target moment in time, occupied a same position on the training terrain and that the training vehicle occupied the same position before the training object;
      the training vehicle and the training object after the target moment in time, occupied the same position on the training terrain and that the training object occupied the same position before the training vehicle;
      the training vehicle and the training object, after the target moment in time, have not occupied the same position on the training terrain; and
      the training object occupied a given position on the training terrain at a future moment in time and that the training vehicle occupied an other given position on the training terrain at the future moment in time and a distance between the given position and the other given position is below a safety threshold distance.

9. The method of claim 1, wherein the method further comprises:
    transmitting, by the server, information representative of the machine learning algorithm to an electronic device associated with the self-driving vehicle;
    at the in-use target moment in time, during operation of the self-driving vehicle:
    executing, by the electronic device, the machine learning algorithm for generating the intent parameter; and
    triggering, by the electronic device, operation of the self-driving vehicle at least in part based on the intent parameter.

10. The method of claim 1, wherein the machine learning algorithm is configured to classify an intent of the object, the intent parameter being indicative of a probability of the intent of the object to be one of a plurality of intent classes.

11. The method of claim 1, wherein the training vehicle is the self-driving vehicle.

12. The method of claim 1, wherein the object is a mobile object.

13. The method of claim 1, wherein the object is at least one of a vehicle and a pedestrian.

14. The method of claim 1, wherein the training terrain comprises a training road segment, and wherein the training terrain data is representative of a bird-eye-view image of the training road segment at the target moment in time.

15. A method of operating a self-driving vehicle, comprising:
    receiving, on an electronic device associated with the self-driving vehicle, data from a sensor associated with the self-driving vehicle, data indicative of a state of the self-driving vehicle, a state of an object in a vicinity of the self-driving vehicle, and terrain on which the self-driving vehicle is moving;
    providing the data to a machine learning algorithm on the electronic device, the machine learning algorithm determining an intent parameter indicative of an intent of the object on the terrain during a target moment in time; and
    triggering, by the electronic device, operation of the self-driving vehicle at least in part based on the intent parameter;
    wherein the machine learning algorithm was trained using a training dataset generated, at least in part by:
        accessing, by a server, operational data associated with a training vehicle, the operational data having been previously stored in a storage, the operational data including data indicative of:
            a training terrain, states of the training vehicle on the training terrain, and states of a training object on the training terrain;
        for a training target moment in time in the operational data:
            retrieving, by the server from the operational data, data indicative of:
                the training terrain at the training target moment in time,
                a target state of the training vehicle corresponding to the training target moment in time, and a future state of the training vehicle after the training target moment in time,
                a target state of the training object corresponding to the training target moment in time, and a future state of the training object after the training target moment in time;
        generating, by the server, the training dataset for training the machine learning algorithm, the training dataset having an input and an assessor-less label,
            the input including the data indicative of the training terrain and of the target states of the training vehicle and the training object,
            the assessor-less label being based on the data indicative of the future states of the training vehicle and the training object, the assessor-less label being indicative of an intent of the training object on the training terrain at the training target moment in time.

16. The method of claim 15, wherein the machine learning algorithm is configured to classify an intent of the object, the intent parameter being indicative of a probability of the intent of the object to be one of a plurality of intent classes.

17. The method of claim 15, further comprising receiving, on the electronic device, information representative of the machine learning algorithm from a server.

18. A self-driving vehicle comprising:
    at least one sensor configured to collect sensor data indicative of a state of the self-driving vehicle, the state of an object in a vicinity of the self-driving vehicle, and terrain on which the self-driving vehicle is moving;
    an electronic device including a processor and a memory, the memory storing programmed instructions that when executed by the processor cause the electronic device to:
        provide the sensor data to a machine learning algorithm executing on the processor, the machine learning algorithm determining an intent parameter indicative of an intent of the object on the terrain during a target moment in time; and
        trigger operation of the self-driving vehicle at least in part based on the intent parameter;
    wherein the machine learning algorithm comprises values stored in the memory that were determined by training the machine learning algorithm using a training dataset generated, at least in part by:
        accessing, by a server, operational data associated with a training vehicle, the operational data having been previously stored in a storage, the operational data including data indicative of:
            a training terrain, states of the training vehicle on the training terrain, and states of a training object on the training terrain;
        for a training target moment in time in the operational data:
            retrieving, by the server from the operational data, data indicative of:
                the training terrain at the training target moment in time,
                a target state of the training vehicle corresponding to the training target moment in time, and a future state of the training vehicle after the training target moment in time,
                a target state of the training object corresponding to the training target moment in time, and a future state of the training object after the training target moment in time;
        generating, by the server, the training dataset for training the machine learning algorithm, the training dataset having an input and an assessor-less label, the input including the data indicative of the training terrain and of the target states of the training vehicle and the training object, the assessor-less label being based on the data indicative of the future states of the training vehicle and the training object, the assessor-less label being indicative of an intent of the training object on the training terrain at the training target moment in time.

19. The self-driving vehicle of claim 18, wherein the machine learning algorithm is configured to classify an intent of the object, the intent parameter being indicative of a probability of the intent of the object to be one of a plurality of intent classes.

20. The self-driving vehicle of claim 18, wherein the memory further stores programmed instructions that when executed by the processor cause the electronic device to receive information representative of the machine learning algorithm from a server.

* * * * *